US012614525B2

(12) United States Patent
Sharma et al.

(10) Patent No.: US 12,614,525 B2
(45) Date of Patent: Apr. 28, 2026

(54) DEMURA TUNING FOR 2D BACKLIGHT SYSTEMS

(71) Applicant: Synaptics Incorporated, San Jose, CA (US)

(72) Inventors: Atul Sharma, Tokyo (JP); Takashi Nose, Kanagawa (JP); Hirobumi Furihata, Tokyo (JP); Akio Sugiyama, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 18/798,005

(22) Filed: Aug. 8, 2024

(65) Prior Publication Data

US 2025/0124884 A1 Apr. 17, 2025

Related U.S. Application Data

(60) Provisional application No. 63/590,868, filed on Oct. 17, 2023.

(51) Int. Cl.
*G09G 3/34* (2006.01)

(52) U.S. Cl.
CPC ... *G09G 3/3426* (2013.01); *G09G 2320/0233* (2013.01); *G09G 2320/0693* (2013.01); *G09G 2360/145* (2013.01); *G09G 2360/16* (2013.01)

(58) Field of Classification Search
CPC ......... G09G 3/3426; G09G 2320/0233; G09G 2320/0693; G09G 2360/145; G09G 2360/16
See application file for complete search history.

(56) References Cited

U.S. PATENT DOCUMENTS

| | | | |
|---|---|---|---|
| 2012/0049745 A1 | 3/2012 | Li et al. | |
| 2014/0104816 A1 | 4/2014 | Takasi et al. | |
| 2019/0348001 A1* | 11/2019 | Shi | G09G 3/32 |
| 2020/0312231 A1 | 10/2020 | Hussell | |

(Continued)

FOREIGN PATENT DOCUMENTS

| | | | |
|---|---|---|---|
| JP | 2013012417 A | 1/2013 | |
| WO | WO-2022141022 A1 * | 7/2022 | G09G 3/006 |

OTHER PUBLICATIONS

International Search Report, dated Jan. 21, 2025, in International Patent Application No. PCT/US2024/050929, filed Oct. 11, 2024.

*Primary Examiner* — Towfiq Elahi
(74) *Attorney, Agent, or Firm* — Leydig, Voit & Mayer Ltd.

(57) ABSTRACT

A method for demura calibration is provided. The method includes acquiring a plurality of brightness maps of a plurality of light sources of a two-dimensional backlight system for a plurality of test patterns, each test pattern indicating each of the plurality of light sources to be turned on or off. Each of the plurality of light sources is turned on in only one of the plurality of test patterns. The plurality of brightness maps indicate brightness levels of the plurality of light sources for the plurality of test patterns. The method further includes producing a cumulative brightness map by adding together the plurality of brightness maps. The method further includes generating demura compensation factors for the plurality of light sources based on the cumulative brightness map.

20 Claims, 13 Drawing Sheets

(56) References Cited

U.S. PATENT DOCUMENTS

| | | | | |
|---|---|---|---|---|
| 2021/0304649 | A1 | 9/2021 | Orio et al. | |
| 2023/0120671 | A1 | 4/2023 | Aogaki et al. | |
| 2024/0013713 | A1 * | 1/2024 | Jacobson ............. | G09G 3/2074 |

* cited by examiner

DEMURA TUNING FOR 2D BACKLIGHT SYSTEMS

CROSS REFERENCE TO RELATED APPLICATIONS

This application claims benefit under 35 U.S.C. § 119(e) to U.S. Provisional Patent Application Ser. No. 63/590,868, filed on Oct. 17, 2023, which is incorporated herein by reference in its entirety.

TECHNICAL FIELD

This disclosure relates generally to demura tuning for two-dimensional (2D) backlight systems.

BACKGROUND

The local dimming function based on two-dimensional (2D) backlighting is one of the technologies for increasing the contrast of liquid crystal display (LCD) devices. The local dimming technology can realize high dynamic contrast and low power consumption by individually controlling the respective light sources (e.g., light emitting diodes (LEDs)) of the 2D backlight system according to input image data.

The image quality of an LCD device with the local dimming function may depend largely on the characteristics of the light sources of the backlight system. In an LCD device with the local dimming function, one major problem is that the brightness uniformity may deteriorate due to variations in the optical characteristics of the respective light sources.

The demura function is a brightness compensation technique used to improve the brightness uniformity of LCD devices with a 2D backlight system. The demura function may work by applying demura compensation factors to brightness values of the respective light sources, wherein the demura compensation factors are determined based on the characteristics of the respective light sources. The demura compensation factors may be stored in the LCD device as demura data, which is used to correct the image unevenness in the LCD device.

In some implementations, the demura compensation factors for the respective light sources may be determined during a tuning or calibration process of the LCD device. The tuning process may involve operating the respective light sources of the 2D backlight system to illuminate the LCD panel in accordance with predetermined test patterns and acquiring brightness maps on the LCD panel for the respective test patterns. The demura compensation factors for the respective light sources may be determined based on the acquired brightness maps.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a method. The method includes acquiring a plurality of brightness maps of a plurality of light sources of a two-dimensional backlight system for a plurality of test patterns, each test pattern indicating each of the plurality of light sources to be turned on or off. Each of the plurality of light sources is turned on in only one of the plurality of test patterns. The plurality of brightness maps indicate brightness levels of the plurality of light sources for the plurality of test patterns. The method further includes producing a cumulative brightness map by adding together the plurality of brightness maps. The method further includes generating demura compensation factors for the plurality of light sources based on the cumulative brightness map.

In another exemplary embodiment, the present disclosure provides a calibration system that includes a processor and a storage device. The storage device is configured to store computer-executable instructions which when executed cause the processor to acquire a plurality of brightness maps of a plurality of light sources of a two-dimensional backlight system for a plurality of test patterns, each test pattern indicating each of the plurality of light sources to be turned on or off. Each of the plurality of light sources is turned on in only one of the plurality of test patterns. The plurality of brightness maps indicate brightness levels of the plurality of light sources for the plurality of test patterns. The computer-executable instructions when executed further causes the processor to produce a cumulative brightness map by adding together the brightness maps, and generate demura compensation factors for the plurality of light sources based on the cumulative brightness map.

In still another exemplary embodiment, the present disclosure provides a non-transitory tangible computer-readable storage medium for demura calibration of a display device including a two-dimensional backlight system. The non-transitory tangible computer-readable storage medium stores computer-executable instructions which when executed cause a processor to acquire a plurality of brightness maps of a plurality of light sources of a two-dimensional backlight system for a plurality of test patterns, each test pattern indicating each of the plurality of light sources to be turned on or off. Each of the plurality of light sources is turned on in only one of the plurality of test patterns. The plurality of brightness maps indicate brightness levels of the plurality of light sources for the plurality of test patterns. The computer-executable instructions when executed further causes the processor to produce a cumulative brightness map by adding together the brightness maps, and generate demura compensation factors for the plurality of light sources based on the cumulative brightness map.

Figure 1:
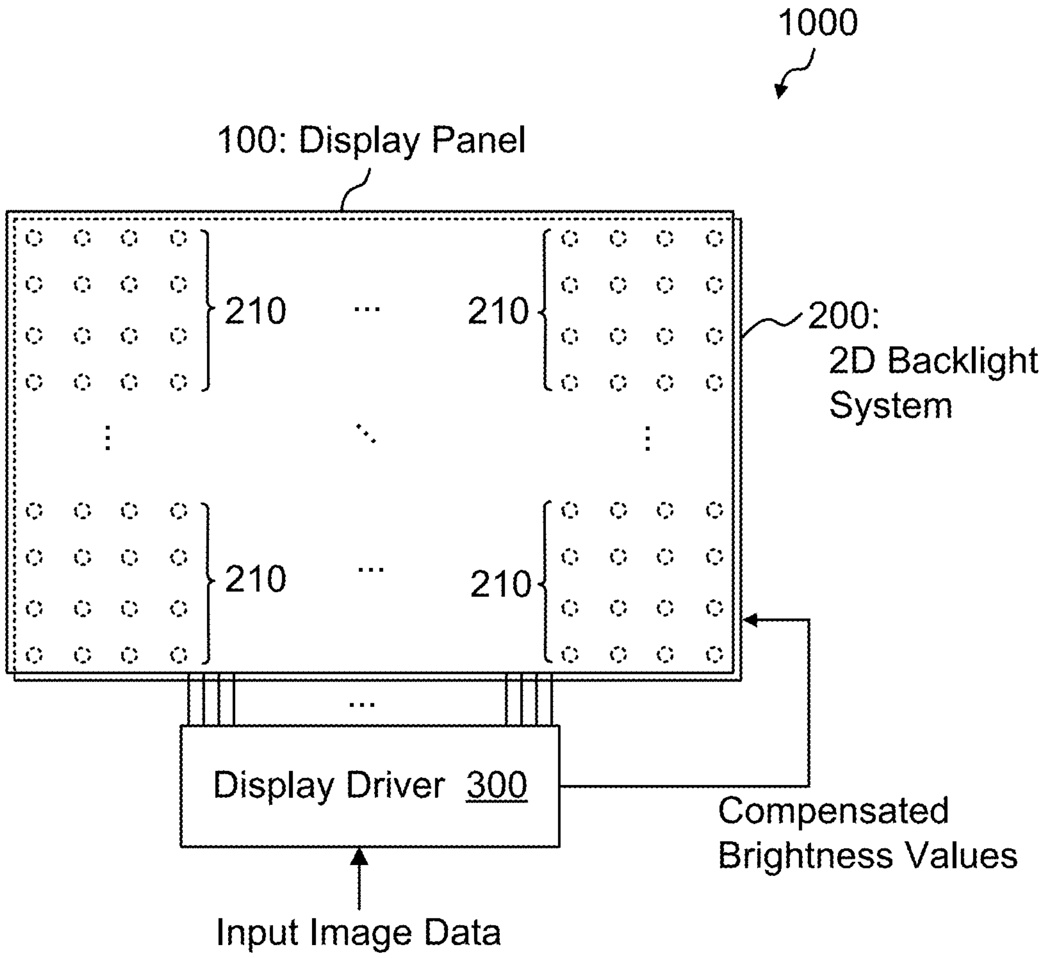
FIG. 1 shows an example configuration of a display device adapted to the local dimming function, according to one or more embodiments.

To facilitate understanding, identical reference numerals have been used, where possible, to designate elements that are common to the figures. It is contemplated that elements disclosed in one embodiment may be utilized in other embodiments without specific recitation. Suffixes may be attached to reference numerals for distinguishing elements from each other. The drawings referred to herein should not be understood as being drawn to scale unless specifically noted. Also, the drawings are often simplified and details or components omitted for clarity of presentation and explanation. The drawings and discussion serve to explain principles discussed below.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term “coupled” as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Figure 2:
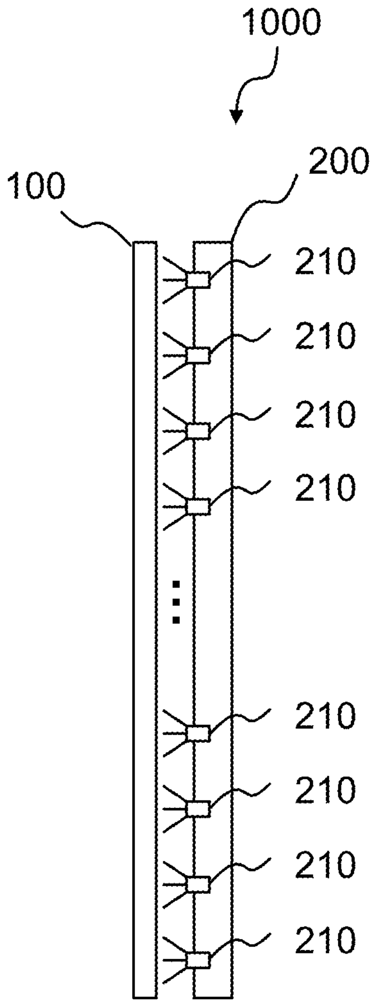
FIG. 2 shows an example side-view configuration of the display device shown in FIG. 1, according to one or more embodiments.

FIG. 1 shows an example configuration of a display device 1000 adapted to the local dimming function, according to one or more embodiments. The display device 1000 includes a liquid crystal display (LCD) panel 100, a two-dimensional (2D) backlight system 200, and a display driver 300. The 2D backlight system 200 is configured to illuminate the display panel 100. The 2D backlight system 200 includes an array of light sources 210. It is noted that the light sources 210 are shown in phantom in FIG. 1 because the light sources 210 are located behind the display panel 200 as shown in FIG. 2, which illustrates a side view configuration of the display device 1000. While 64 light sources 210 are shown in FIG. 1, those skilled in the art would appreciate that the 2D backlight system 200 may include more or less than 64 light sources 210. In actual implementations, the 2D backlight system 200 may include several hundred to several thousand light sources 210. In one implementation, each light source 210 may include an LED or a different type of light source.

Figure 3:
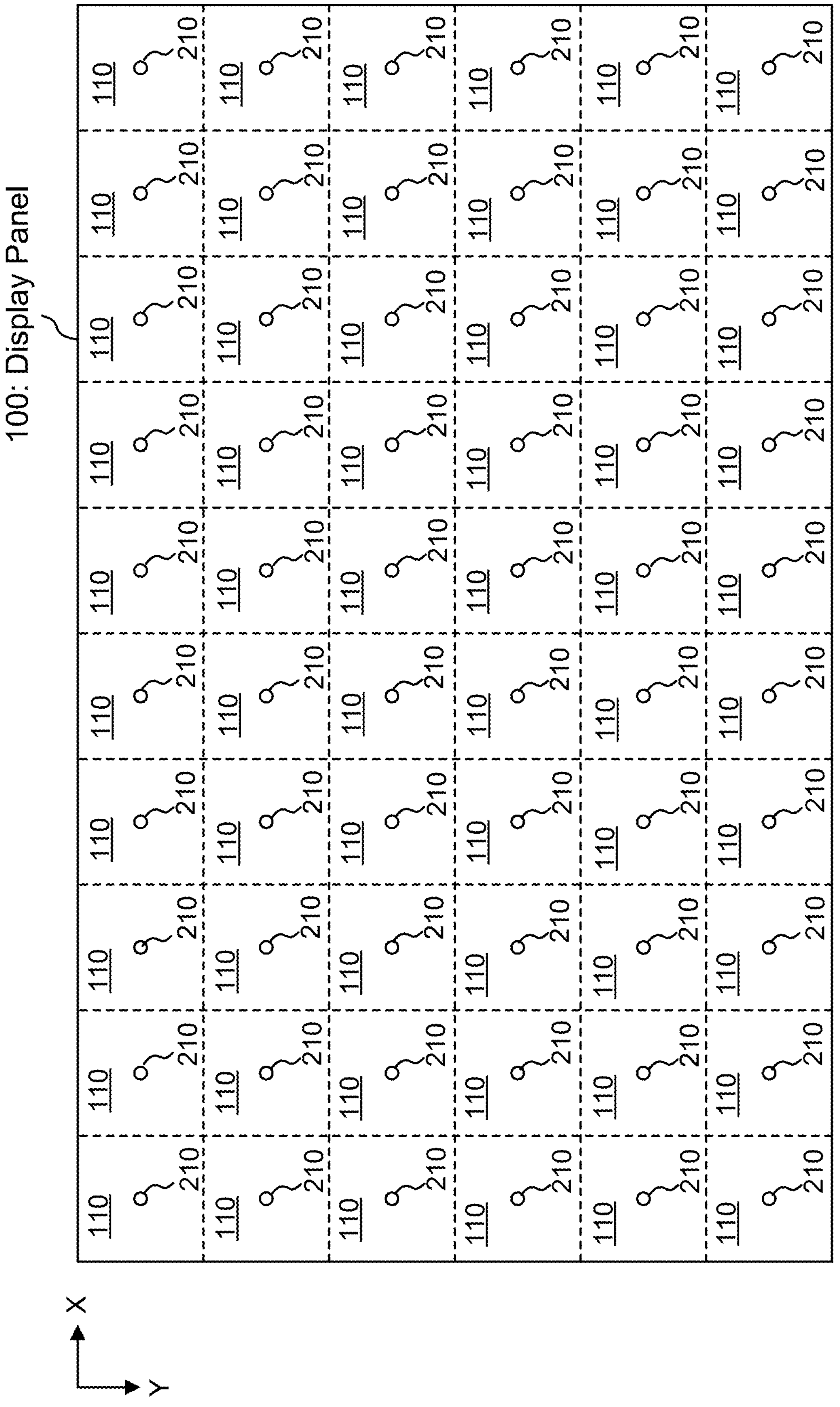
FIG. 3 shows an example arrangement of light sources of a 2D backlight system, according to one or more embodiments.

FIG. 3 shows an example arrangement of the light sources 210 of the 2D backlight system 200, according to one or more embodiments. In the shown embodiment, the display panel 100 is segmented into rectangular (e.g., square) zones 110 arranged in rows and columns, and the light sources 210 are located behind the corresponding zones 110, respectively. Each light source 210 is located such that the projection of each light source 210 onto the display panel 100 is positioned at the center (e.g., the geometric center) of the corresponding one of the zones 110. As used herein, the “corresponding zone” 110 of a light source 210 refers to the zone 110 that includes the projection of that light source 210 onto the display panel 100. It should be noted that due to the light diffusion characteristics of the light sources 210, each light source 210 primarily illuminates the corresponding zone 110, but may secondarily illuminate at least portions of the zones 110 around (e.g., adjacent to) the corresponding zone 110.

Referring back to FIG. 1, the display driver 300 is configured to receive input image data representing an input image from an external image source (not shown) and drive the display panel 100 to display an image corresponding to the input image data. The input image data may include pixel data for respective pixels of the input image. The pixel data for a pixel may include greylevels of respective primary colors (e.g., red (R), green (G), and blue (B)).

The display driver 300 is further configured to implement a local dimming function by individually controlling the respective light sources 210 of the 2D backlight system 200 according to input image data. The local dimming function may determine base brightness values for the respective light sources 210 based on the input image data. The base brightness value for each light source 210 may correspond to the desired luminance level of that light source 210. The base brightness value for a target light source 210 may be determined based on the pixel data of pixels located in the corresponding zone 110 of the target light source 210. In some implementations, the base brightness value for the target light source 210 may be determined further based on pixel data of pixels located in at least portions of the zones 110 adjacent to the corresponding zone 110 of the target light source 210.

The display driver 300 is further configured to implement a demura function in controlling the light sources 210 of the 2D backlight system 200. In one implementation, the display driver 300 may be configured to store demura data that includes demura compensation factors and apply the stored demura compensation factors to the base brightness values for the respective light sources 210 to generate compensated brightness values for the respective light sources 210. The 2D backlight system 200 may be configured to cause the respective light sources 210 to emit light at the luminance levels indicated by the compensated brightness values.

The demura data may be generated during a tuning or calibration process of the display device 1000. In accordance with various embodiments of the present disclosure, various techniques are disclosed for efficiently determining the demura compensation factors of the demura data for the respective light sources of a 2D backlight system. Alternatively, the demura data or the demura compensation factors may be dynamically generated during normal use of the display device 1000.

Figure 4:
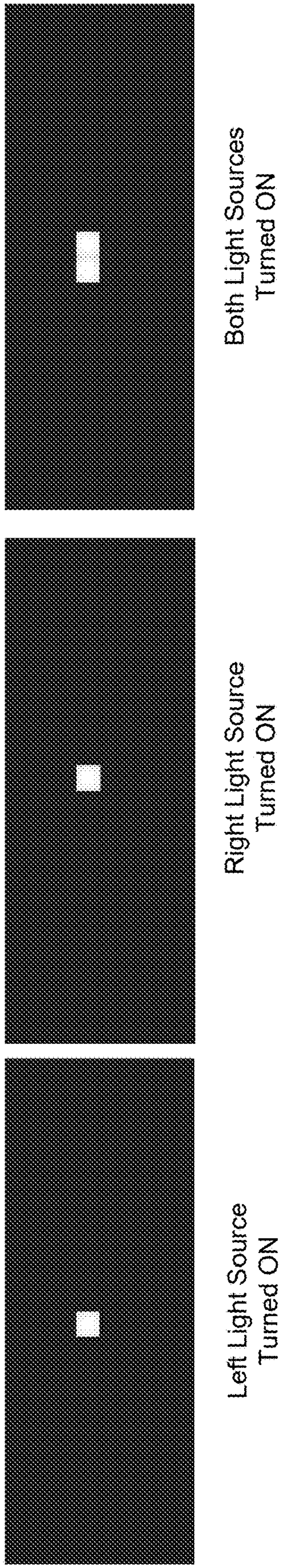
FIG. 4 shows example test patterns used to measure the light diffusion characteristics of each light source, according to one or more embodiments.

In one or more embodiments, a tuning process for determining demura compensation factors for the light sources of a 2D backlight system may evaluate the light diffusion characteristics of each light source 210. FIG. 4 shows example test patterns used to measure the light diffusion characteristics of each light source 210, according to one or more embodiments. These test patterns are associated with two adjacent light sources and are determined under the assumption that the light sources 210 of the 2D backlight system 200 have the same light diffusion characteristics. The left image of FIG. 4 shows a first test pattern in which one light source 210 on the left is "turned on", the middle image of FIG. 4 shows a second test pattern in which the other light source 210 on the right is "turned on", and the right image of FIG. 4 shows a third test pattern in which both the light sources 210 are "turned on", wherein the white squares in FIG. 4 indicate the light sources 210 that are turned on. The term "turned on" may mean that the light source is driven to emit light at a predetermined brightness level (e.g., the allowed maximum brightness level).

Figure 5:
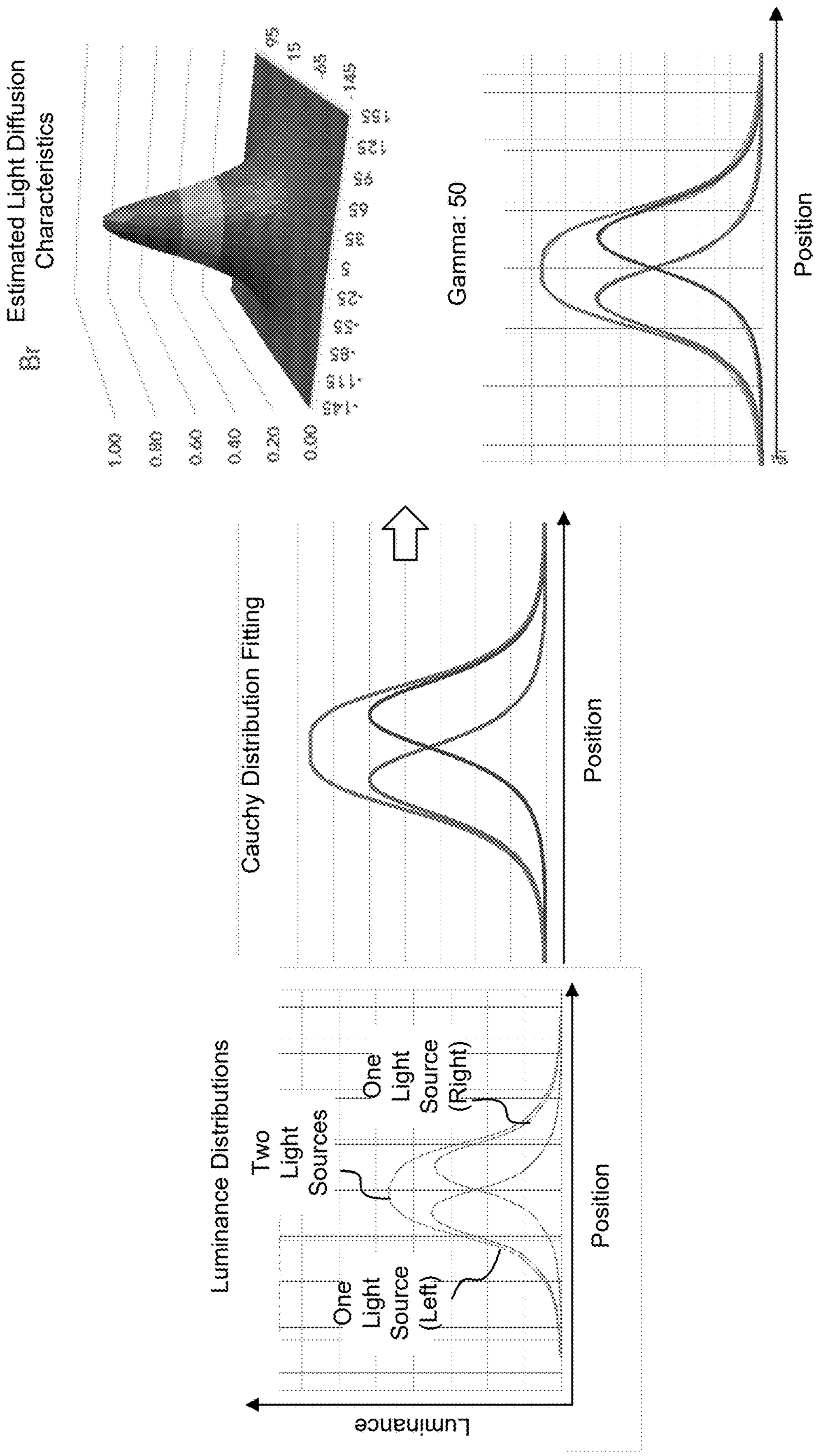
FIG. 5 shows example light diffusion characteristics acquired by a fitting procedure, according to one or more embodiments.

In one or more embodiments, the luminance distributions of the one-hot light source (left and right) and the two-hot light sources may be observed using the three test patterns as shown in the graph on the left of FIG. 5. Further, a fitting procedure is implemented to estimate parameters of a distribution function that best fits the light diffusion characteristics of each light source. In one implementation, as shown in the middle graph of FIG. 5, a Cauchy distribution fitting procedure may be implemented to estimate the parameters of the Cauchy distribution that best fits the light diffusion characteristics of each light source. The right graph of FIG. 5 shows an example of the estimated light diffusion characteristics of each light source acquired by the Cauchy distribution fitting procedure.

Figure 6:
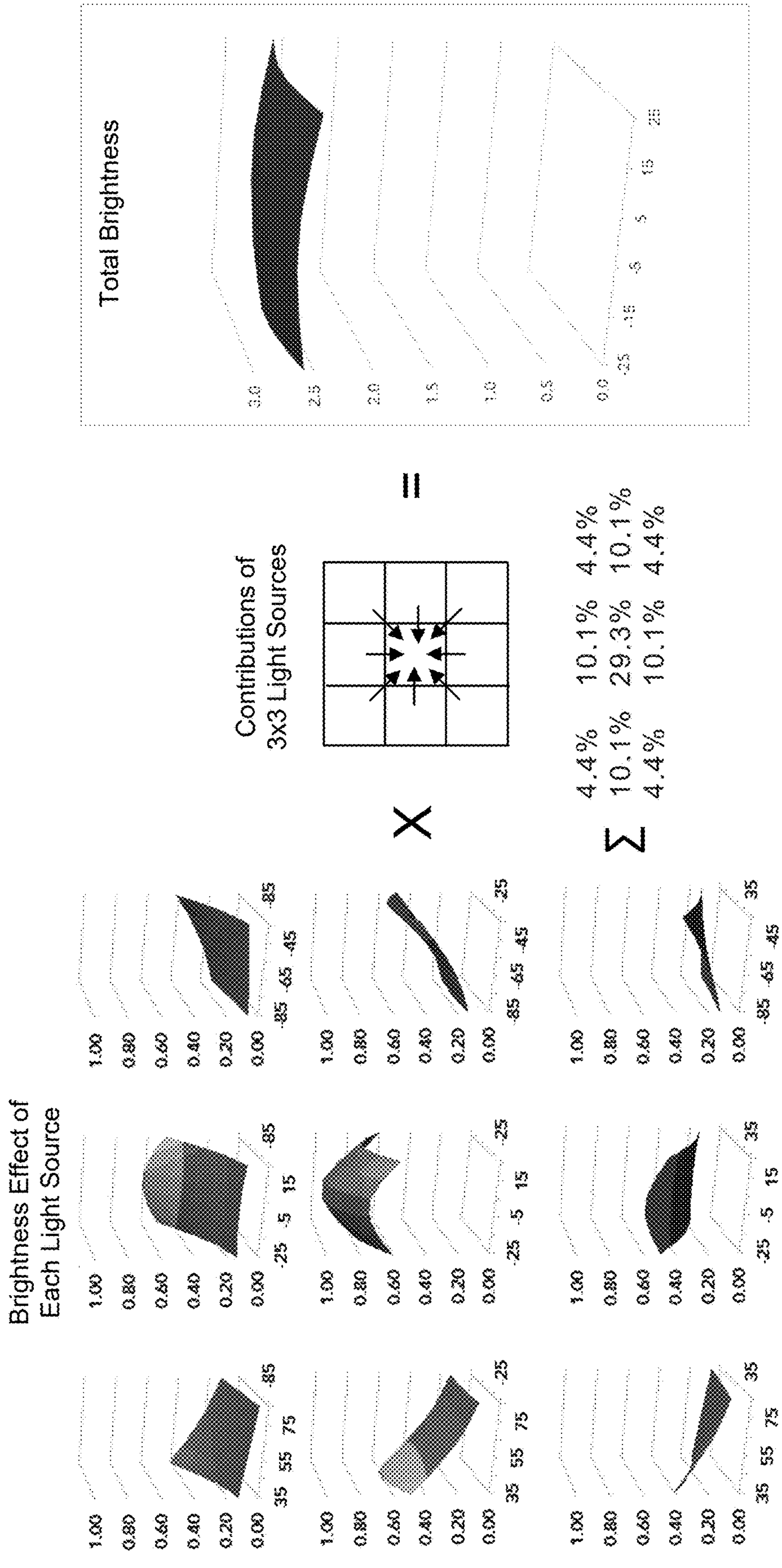
FIG. 6 shows example contributions of surrounding light sources to the total brightness of a zone corresponding to a center light source, according to one or more embodiments.

Referring to FIG. 6, the present disclosure recognizes that the total brightness level of the zone corresponding to a given light source, which may be referred to as the center light source, is the result of the combined light outputs of the center light source and its surrounding light sources that form a 3×3 light source array. In the shown embodiment, the center light source is responsible for about 30% of the total brightness level, while the surrounding light sources contribute about the remaining 70%. In one or more embodiments, based on the estimated distribution function (e.g., the estimated Cauchy distribution), the tuning process generates a directivity filter that represents the light diffusion characteristics of the light sources. The directivity filter may represent the respective contributions of the center light source and its surrounding light sources of the relevant 3×3 light source array to the total brightness level of the zone of interest. In one embodiment, the directivity filter may include directivity coefficients assigned to the center light source and the surrounding light sources of the relevant 3×3 light source array. One example of the directivity filter is shown in FIG. 6 as a 3×3 matrix. As discussed later, the directivity filter is used to calculate the brightness compensation factor for each light source.

In one or more embodiments, the tuning process may further include acquiring a brightness map of the light sources 210. The brightness map may indicate the brightness levels of the respective light sources 210 for the entire light source array. The demura compensation factors may be calculated based on the brightness map. One issue is that due to the light diffusion characteristics of the respective light sources 210 as discussed in relation to FIG. 6, the measurement result of each light source 210 may be affected by the surrounding light sources.

Figure 7:
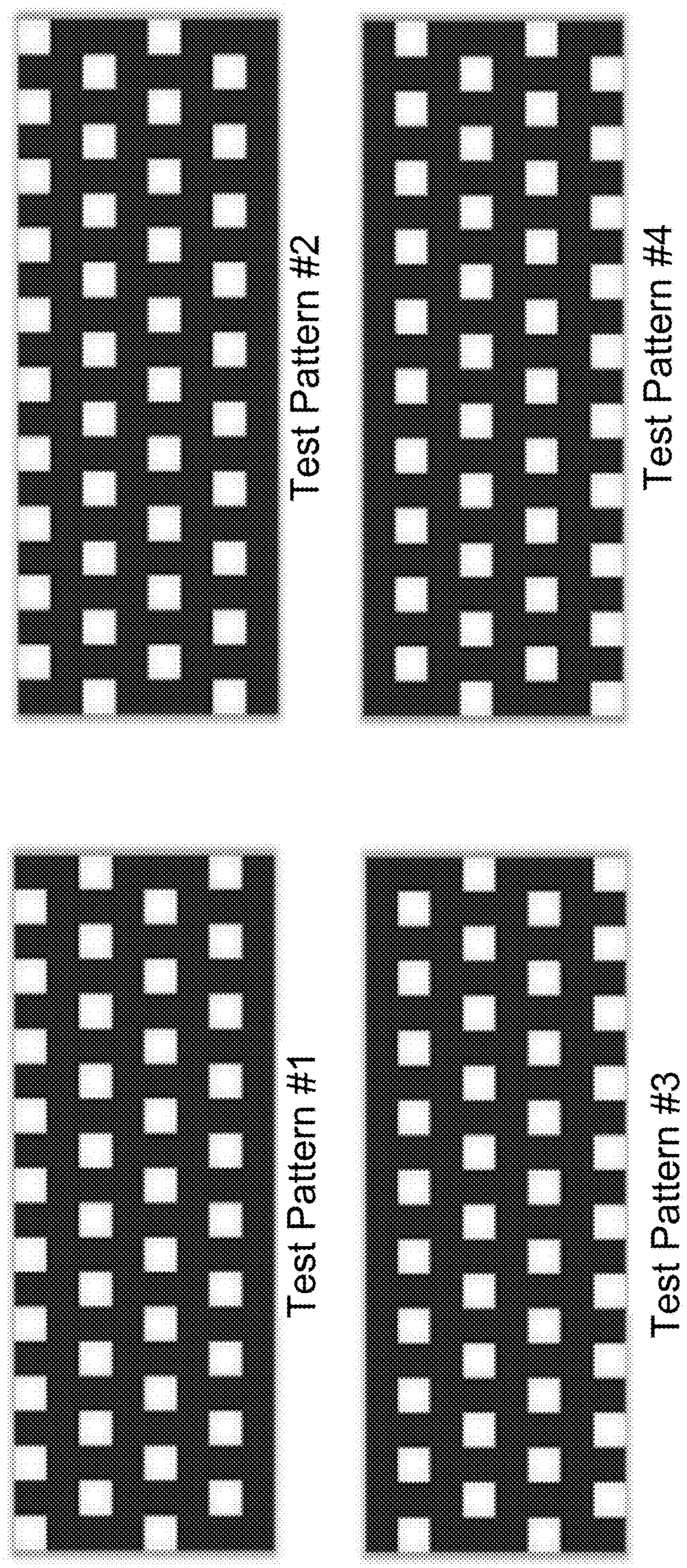
FIG. 7 shows example test patterns used to illuminate a display panel and measure brightness levels of respective light sources, according to one or more embodiments.

Referring to FIG. 7, to accurately determine the brightness levels of individual light sources 210, a plurality of test patterns, each indicating each of the plurality of light sources to be turned on or off, are used to illuminate the display panel in the tuning process. The test patterns are determined such that each of the light sources 210 is turned on in only one of the test patterns. The tuning process may include acquiring a plurality of brightness maps of the light sources 210 for the plurality of test patterns, respectively, and producing a cumulative brightness map by adding together the plurality of brightness maps. The demura compensation factors for the respective light sources may be generated based on the cumulative brightness map.

In one or more embodiments, four test patterns #1, #2, #3, and #4 shown in FIG. 7 may be used to illuminate the display panel in the tuning process. The four test patterns #1, #2, #3, and #4 are determined such that the brightness level of each light source (e.g., an LED) does not significantly affect the measurement results of the brightness levels of the light sources around that light source. In one or more embodiments, the four test patterns #1 to #4 may be defined such that each light source is turned on in only one of the four test patterns #1 to #4. In some embodiments, a first set of light sources 210 may be turned on in test pattern #1, a second set of light sources 210 may be turned on in test pattern #2, a third set of light sources 210 may be turned on in test pattern #3, and a fourth set of light sources 210 may be turned on in test pattern #4. In such embodiments, the first, second, third, and fourth sets of light sources 210 may share no light source, and each light source 210 may belong to only one of the first, second, third, and fourth sets of light sources 210.

The four test patterns #1 to #4 may be further defined such that each turned-on light source 210 is surrounded only by, or adjacent only to, turned-off light sources 210. In other words, the four test patterns #1 to #4 may be further defined such that each turned-on light source 210 is horizontally, vertically, and diagonally adjacent to turned-off light sources 210. In one implementation, each turned-on light source 210 of test pattern #2 is horizontally adjacent to the corresponding turned-on light source 210 of test pattern #1, each turned-on light source 210 of test pattern #3 is vertically adjacent to the corresponding turned-on light source 210 of test pattern #1, and each turned-on light source 210 of test pattern #4 is diagonally adjacent to the corresponding turned-on light source 210 of test pattern #1.

Figure 8:
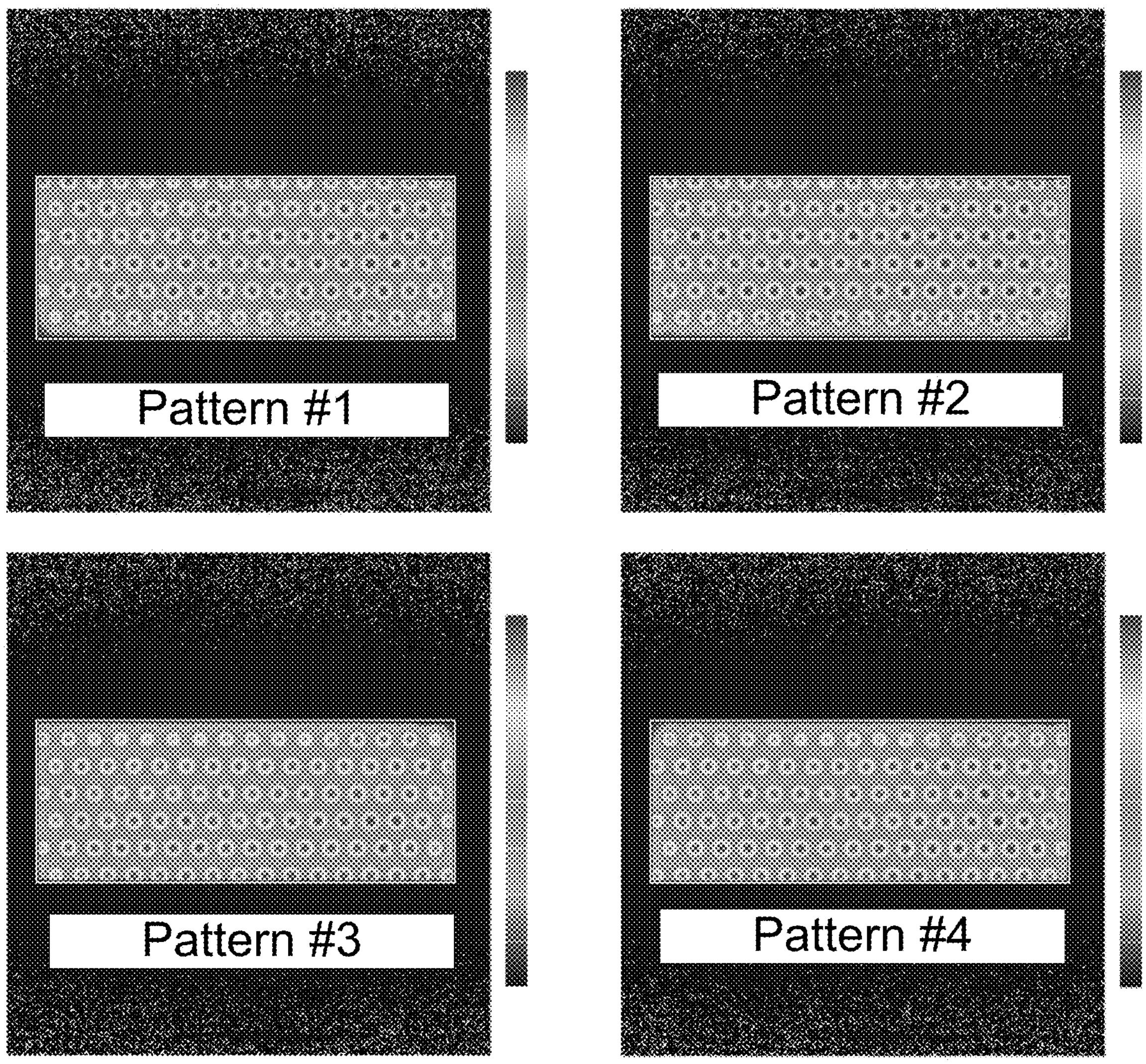
FIG. 8 shows example images captured using the four test patterns shown in FIG. 7, according to one or more embodiments.

FIG. 8 shows example images captured using the four test patterns #1, #2, #3, and #4 shown in FIG. 7, according to one or more embodiments. The four images may be captured by an imaging device (e.g., a camera) while the display panel 100 is illuminated with the four test patterns #1, #2, #3, and #4, respectively. The captured images each indicate the luminance level distribution generated by the turned-on light sources 210. The top left image shows an example luminance level distribution captured with test pattern #1 shown in FIG. 7, and the top right image shows an example luminance level distribution captured with test pattern #2. The bottom left image shows an example luminance level distribution captured with test pattern #3 and the bottom right image shows an example luminance level distribution is captured with test pattern #4. As shown in FIG. 8, the four test patterns #1, #2, #3, and #4 are defined such that the portion of the display panel illuminated by each turned-on light source does not overlap the portions of the display panel illuminated by any other turned-on light sources. In one or more embodiments, the captured images are analyzed to generate brightness maps for the four test patterns #1 to #4, each brightness map indicating the brightness levels of the turned-on light sources.

Figure 9:
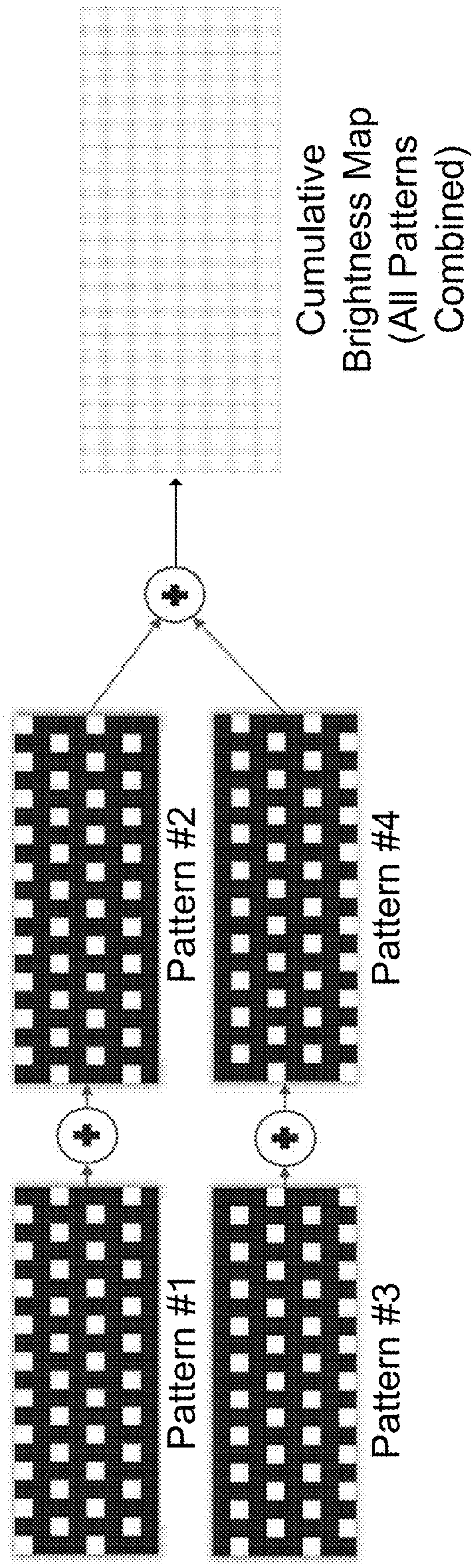
FIG. 9 shows an example process for producing a cumulative brightness map of the entire light source array, according to one or more embodiments.

As shown in FIG. 9, a cumulative brightness map of the entire light source array is then generated by adding together the brightness maps generated for the four test patterns #1 to #4. The cumulative brightness map may indicate the brightness levels of the respective light sources of the entire light source array. The demura compensation factors are generated based on the cumulative brightness map thus generated.

Figure 10:
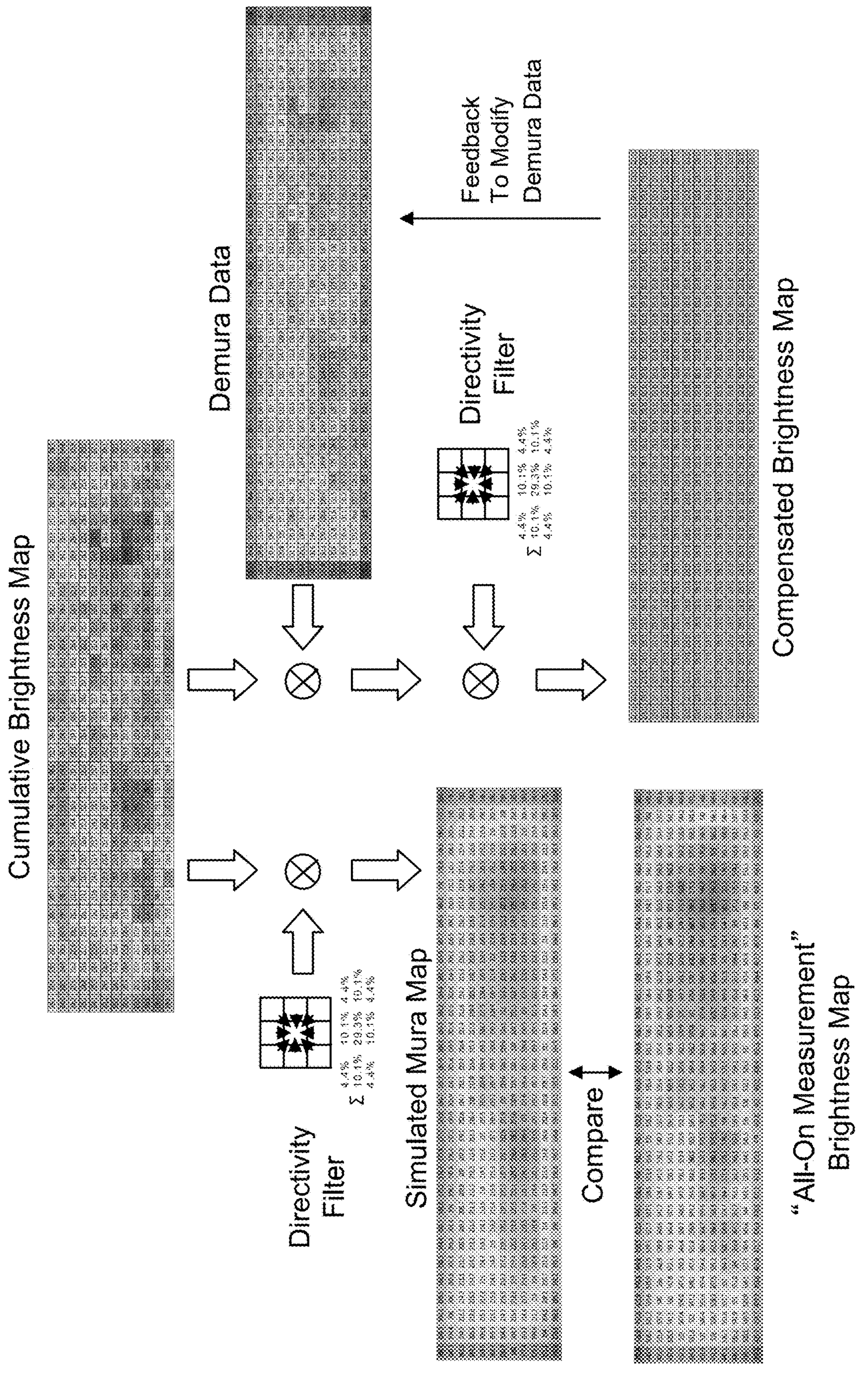
FIG. 10 shows an example scheme for generating demura compensation factors, according to one or more embodiments.

FIG. 10 illustrates an example process for generating the demura data or demura compensation factors, according to one or more embodiments. The process may include confirming the correctness of the cumulative brightness map as shown in the left part of FIG. 10. More specifically, a simulated mura map may be calculated by applying the directivity filter (described in relation to FIG. 6) to the cumulative brightness map. The simulated mura map may simulate the brightness mura on the display panel that occurs when the display panel is illuminated by all the light sources without the demura function. The simulated mura map may be compared to an "all-on measurement" brightness map, which is a brightness map generated based on an image captured while the display panel is illuminated by all light sources 210. If the simulated mura map is sufficiently similar to the "all-on measurement" brightness map, this indicates that the cumulative brightness map has been successfully generated. In this case, the cumulative brightness map is used to generate the demura data as described below. If there is a significant difference between the simulated mura map and the all-on measurement brightness map, the generated cumulative brightness map may be discarded, and the process described above of acquiring brightness maps for the four test patterns may be repeated to successfully generate a cumulative brightness map.

Figure 11:
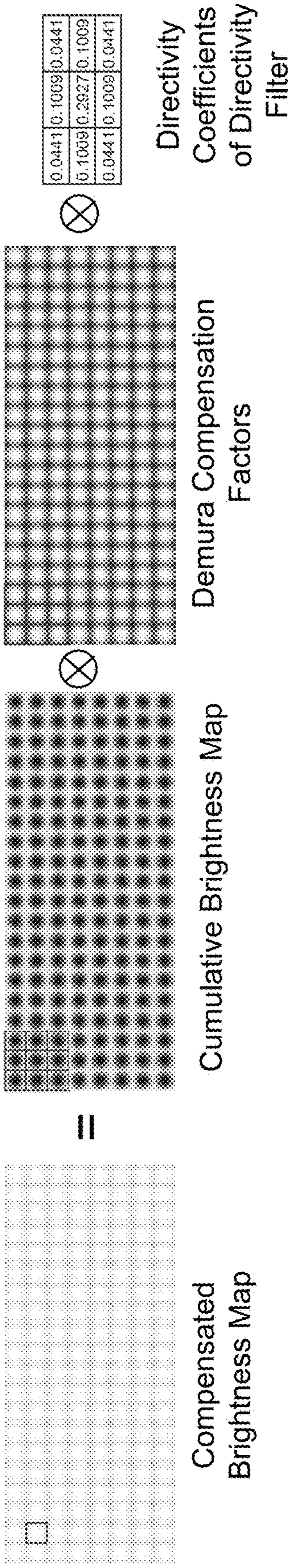
FIG. 11 shows an example scheme for calculating the compensated brightness map, according to one or more embodiments.

The right part of FIG. 10 illustrates an example process for generating the demura data or demura compensation factors using the cumulative brightness map, according to one or more embodiments. The demura compensation factors may be determined by a recursive process as follows. An initial set of demura compensation factors is first determined, and a compensated brightness map is calculated by applying the initial demura compensation factors and the directivity filter to the cumulative brightness map. FIG. 11 shows an example scheme for calculating the compensated brightness map, according to one or more embodiments. In the shown embodiment, the brightness level of a light source (x, y) in the compensated brightness map may be calculated according to the following expression (1):

$$BC_{image}(x, y) = \sum\nolimits_m \sum\nolimits_n C_{image}(x-m, y-n) \times Cf(x-m, y-n) \times Dc(m, n), \tag{1}$$

where (x, y) indicates the light source in the x-th row and the y-th column of the light source array, $BC_{image}(x, y)$ is the brightness level of the light source (x, y) in the compensated brightness map, $C_{image}(x\text{-}m, y\text{-}n)$ is the combined brightness level of the light source (x-m, y-n) in the cumulative brightness map, Cf (x-m, y-n) is the demura compensation factor for the light source (x-m, y-n), Dc (m, n) is the directivity coefficient of the m-th row and the n-th column of the directivity filter, $\Sigma_m$ is the sum with respect to the rows of the directivity filter, and $\Sigma_n$ is the sum with respect to the columns of the directivity filter. The respective differences between a target brightness level and the brightness levels of the respective light sources in the compensated brightness map are then calculated, and the initial demura compensation factors are modified based on the respective differences to generate a new set of demura compensation factors. Another compensated brightness map is then calculated using the new set of demura compensation factors in a similar manner. This process is repeated until the ratio of the maximum brightness level to the minimum brightness level in the compensated brightness map sufficiently approaches one. In one implementation, the recursive process is repeated until the ratio of the maximum brightness level to the minimum brightness level in the compensated brightness map falls in a range between 1.0-a and 1.0+a, where a is a positive number sufficiently smaller than 1.0. The resulting demura compensation factors are stored in the display driver and used as the demura data to implement the demura function by the display driver.

Figure 12:
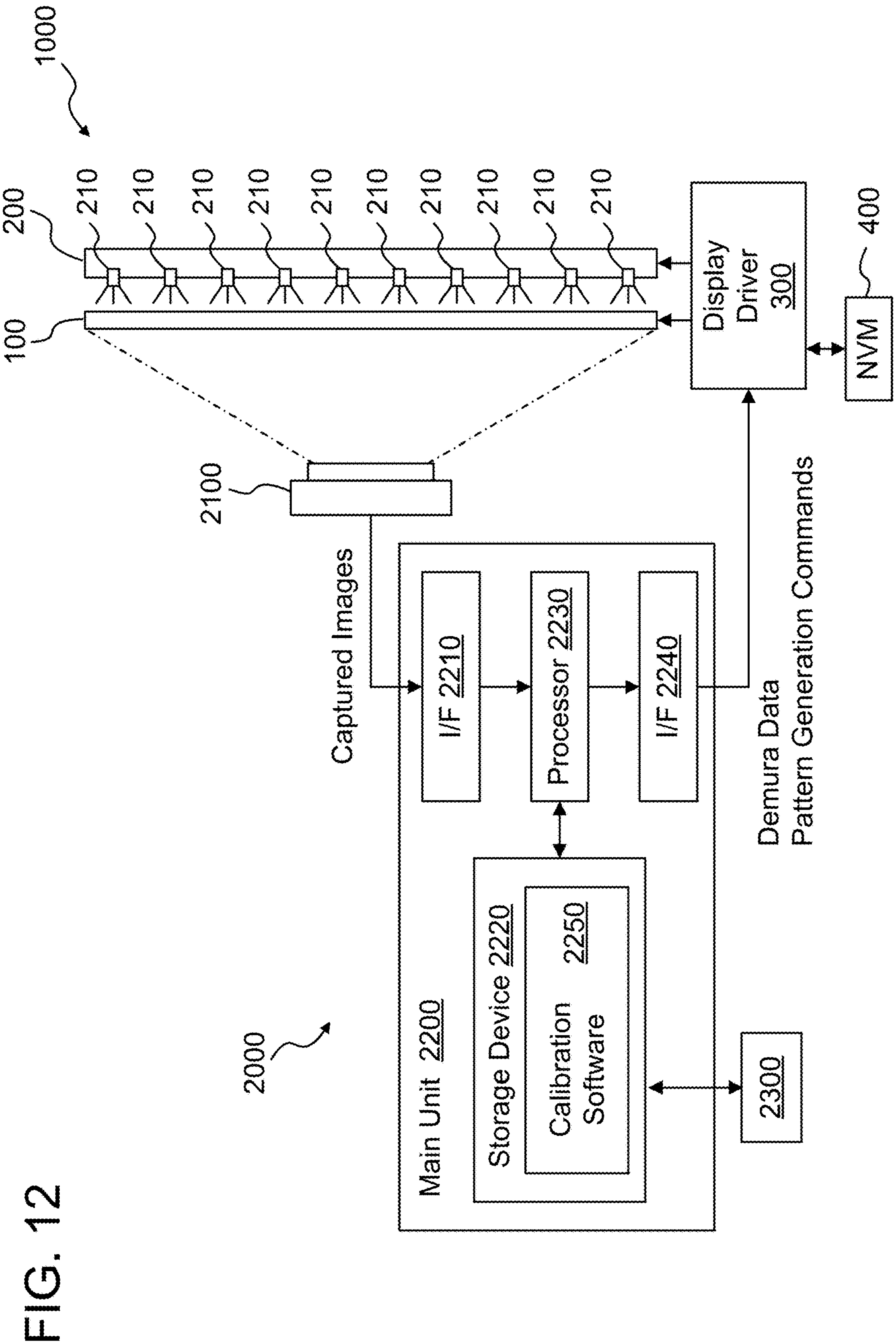
FIG. 12 shows an example configuration of a calibration system, according to one or more embodiments.

FIG. 12 shows an example configuration of a calibration system 2000 configured to perform a tuning or calibration process to generate and provide demura data to the display driver 300, according to one or more embodiments. The demura data may include demura compensation factors for the respective light sources 210. As described above, the display driver 300 may be configured to implement a local dimming function to determine base brightness values for the respective light sources 210 based on the input image data. The display driver 300 may further be configured to implement a demura function that applies the demura compensation factors to the base brightness values for the respective light sources 210 to generate compensated brightness values for the respective light sources 210. The 2D backlight system 200 may be configured to cause the respective light sources 210 to emit light at the luminance levels indicated by the compensated brightness values.

In one or more embodiments, the calibration system 2000 includes an imaging device 2100 (e.g., a camera) and a main unit 2200. The imaging device 2100 may be configured to capture images of the display panel 100 to measure the luminance distributions on the display panel 100 for the test patterns based on the captured images. In one or more embodiments, the imaging device 2100 may be configured to measure (1) a first luminance distribution on the display panel 100 while the "left" light source of the two associated light sources is turned on as shown in the left image of FIG. 4, (2) a second luminance distribution on the display panel 100 while the "right" light source is turned on as shown in the middle image of FIG. 4, and (3) a third luminance distribution on the display panel 100 while both the two associated light sources are turned on as shown in the right image of FIG. 4. As described in relation to FIGS. 4 to 6, these three luminance distributions are used to estimate the light diffusion characteristics of the light sources 210 and generate the directivity filter that represents the light diffusion characteristics of the light sources 210.

The imaging device 2100 may further be configured to capture images of the display panel 100 for test patterns #1 to #4 shown in FIG. 7. In some embodiments, the imaging device 2100 may be configured to capture (1) a first image of the display panel 100 while the 2D backlight system 200 illuminates the display panel 100 with test pattern #1; (2) a second image of the display panel 100 while the 2D backlight system 200 illuminates the display panel 100 with test pattern #2; (3) a third image of the display panel 100 while the 2D backlight system 200 illuminates the display panel 100 with test pattern #3; and (4) a fourth image of the display panel 100 while the 2D backlight system 200 illuminates the display panel 100 with test pattern #4. The images captured for test patterns #1 to #4 are used to generate the demura data used for the demura function as described in relation to FIGS. 7 to 10, wherein the demura data includes the demura compensation factors for the respective light sources 210.

In one or more embodiments, the main unit 2200 includes an interface (I/F) circuit 2210, a storage device 2220, a processor 2230, and an interface circuit 2240. In one or more embodiments, the interface circuit 2210 is configured to interface the main unit 2200 with the imaging device 2100, and the interface circuit 2240 is configured to interface the main unit 2200 with the display driver 300.

The storage device 2220 is configured as a non-transitory tangible computer-readable storage medium that stores calibration software 2250 therein. The calibration software 2250 includes computer executable instructions for performing the tuning or calibration process of the display device 1000. More specifically, the calibration software 2250 may include computer executable instructions that, when executed, cause the processor 2230 to generate pattern generation commands that instruct the display driver 300 to illuminate the display panel 100 with desired test patterns, including the test patterns shown in FIG. 4 and test patterns #1 to #4 shown in FIG. 7. The pattern generation commands are provided to the display driver 300 via the interface circuit 2240.

The calibration software 2250 may further include computer executable instructions that, when executed, cause the processor 2230 to generate control commands that instruct the imaging device 2100 to capture images of the display panel 100 while the display panel 100 is illuminated with desired test patterns, which may include the three test patterns shown in FIG. 4 and the four test patterns #1 to #4 shown in FIG. 7. The control commands may be provided to the imaging device 2100 via the interface circuit 2210.

The calibration software 2250 may further include computer executable instructions that, when executed, cause the processor 2230 to determine the luminance distributions of the display panel 100 for the three test patterns shown in FIG. 4 based on the images of the display panel 100 which are captured by the imaging device 2100 for those test patterns. The computer executable instructions, when executed, further cause the processor 2230 to generate the directivity filter based on the determined luminance distributions. As discussed above, the directivity filter may represent the respective contributions of a light source of interest (which may also be referred to as the center light source) and its surrounding light sources that form a 3×3 light source array to the total brightness level of the zone corresponding to the light source of interest. The directivity filter may include the directivity coefficients assigned to the center light source and the surrounding light sources of the relevant 3×3 light source array.

The calibration software 2250 may further include computer executable instructions that, when executed, cause the processor 2230 to acquire the images captured by the imaging device 2100 for test patterns #1 to #4 shown in FIG. 7 via the interface circuit 2210 and to generate the demura data, which may include the demura compensation factors for the respective light sources 210, based on the captured images. The demura data may be generated using the directivity filter by the process described above in relation to FIG. 10. The demura data is provided to the display driver 300 via the interface circuit 2240.

The calibration software 2250 may be installed on the storage device 2220 using a non-transitory tangible computer-readable recording medium 2300 that records the calibration software 2250. Alternatively, the calibration software 2250 may be provided to the calibration system 2000 as a computer program product that is downloadable from a server.

In some embodiments, a non-volatile memory (NVM) 400 may be coupled to the display driver 300, and the display driver 300 may be configured to store the demura data in the NVM 400. In such embodiments, the display driver 300 may be configured to retrieve the demura data from the NVM 400 and perform the demura function to using the retrieved demura data.

Figure 13:
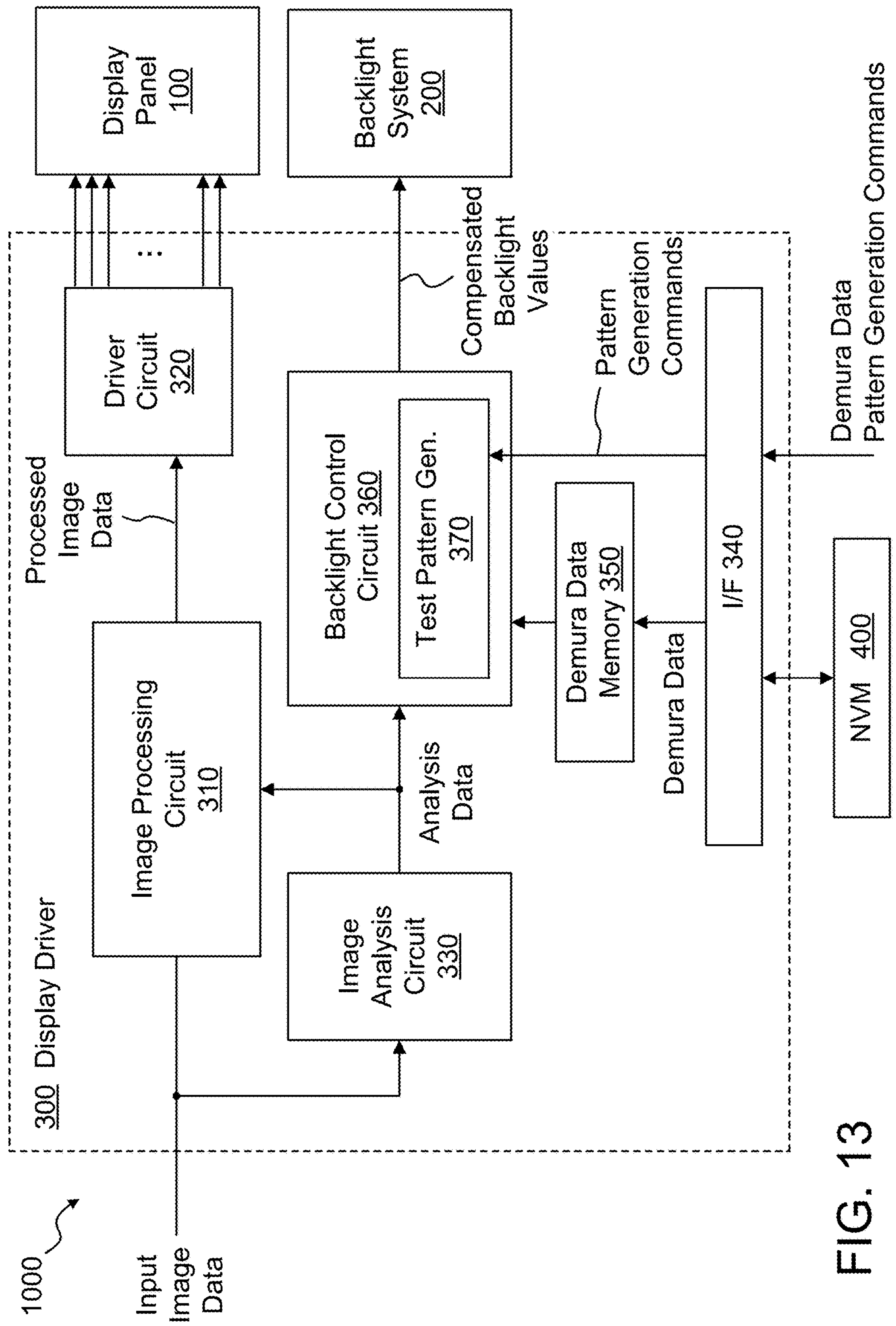
FIG. 13 shows an example configuration of a display driver, according to one or more embodiments.

FIG. 13 shows an example configuration of the display driver 300 configured to perform the local dimming function and the demura function as described above, according to one or more embodiments. In the shown embodiment, the display driver 300 includes an image processing circuit 310, a driver circuit 320, an image analysis circuit 330, an interface (I/F) circuit 340, a demura data memory 350, and a backlight control circuit 360.

The image processing circuit 310 is configured to perform image processing on the input image data to generate processed image data. The image processing performed by the image processing circuit 310 may include color adjustment, demura correction, deburn correction, image scaling, gamma transformation, or other image processing. The driver circuit 320 is configured to receive the processed image data from the image processing circuit 310 and to drive respective pixels of the display panel 100 based, at least in part, on the processed image data.

The image analysis circuit 330 is configured to analyze the input image data to generate analysis data. The analysis data may include information indicative of the brightness of the input image around each light source 210. In some embodiments, the analysis data may include an average picture level (APL) of each zone 110 (shown in FIG. 3) calculated from the input image data. In other embodiments, the image analysis circuit 330 may be configured to: (1) select a target image part of the input image for each light source 210 such that the target image part encompasses the corresponding zone 110 of that light source 210; (2) apply filtering to the target image part to generate filtered image part for each light source 210; and (3) calculate the APL of the filtered image part generated for each light source 210. In such embodiments, the analysis data may include the APL of the filtered image part generated for each light source 210. The analysis data is provided to the backlight control circuit 360 and used to implement the local dimming function to individually control the luminance levels of the light sources 210 of the 2D backlight system 200. The analysis data may also be provided to the image processing circuit 310. In such implementations, the image processing circuit 310 may process the input image data based on the analysis data.

The interface circuit 340 is configured to receive the demura data from the calibration system 2000 and store the demura data in the NVM 400. The interface circuit 340 is further configured to retrieve the demura data from the NVM 400 upon start-up or power-on reset and store the retrieved demura data in the demura data memory 350. The demura data memory 350 is configured to provide the demura data to the backlight control circuit 360 to achieve the demura function.

The backlight control circuit 360 is configured to implement the local dimming function based on the analysis data. More specifically, the backlight control circuit 360 is configured to generate base backlight values for the respective light sources 210 based on the analysis data. In some embodiments, the base backlight value for each light source 210 may be determined based on the APL of the corresponding zone 110 of that light source 210. In other embodiments, the base backlight value for each light source 210 may be determined based on the APL of the filtered image part generated for that light source 210 as described above. The backlight control circuit 360 is further configured to receive the demura data from the demura data memory 350, and to implement the demura function based on the received demura data. In one implementation, the demura data may include the demura compensation factors for the respective light sources 210 of the 2D backlight system 200, and the backlight control circuit 360 may be configured to apply the demura compensation factors for the respective light sources 210 to the base backlight values to generate the compensated backlight values. The compensated backlight values are provided to the backlight system 200 to control the luminance levels of the light sources 210.

In some embodiments, the backlight control circuit 360 may include a test pattern generator 370 configured to control the luminance levels of the light sources 210 of the 2D backlight system 200 in response to the pattern generation commands received from the calibration system 2000 (shown in FIG. 12) via the interface circuit 340. The test pattern generator 370 may be configured to generate the backlight values for the respective light sources 210 in response to the pattern generation commands such that the display panel 100 is illuminated with desired test patterns. More specifically, the test pattern generator 370 may be configured to generate backlight values to cause the 2D backlight system 200 to illuminate the display panel 100 with the three test patterns shown in FIG. 4 when the calibration system 2000 acquires the luminance distributions on the display panel 100 for those test patterns and generates the directivity filter based on the acquired luminance distributions. The test pattern generator 370 may further be configured to generate backlight values to cause the 2D backlight system 200 to illuminate the display panel 100 with the four test patterns #1 to #4 shown in FIG. 7 when the calibration system 2000 captures the images of the display panel 100 for test patterns #1 to #4 and generates the demura data based on the captured images.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:

acquiring a plurality of brightness maps of a plurality of light sources of a two-dimensional backlight system for a plurality of test patterns, each test pattern indicating each of the plurality of light sources to be turned on or off, each of the plurality of light sources being turned on in only one of the plurality of test patterns, wherein the plurality of brightness maps indicate brightness levels of the plurality of light sources for the plurality of test patterns;

producing a cumulative brightness map by adding together the plurality of brightness maps; and generating demura compensation factors for the plurality of light sources based on the cumulative brightness map, wherein the plurality of test patterns includes:

a first test pattern in which a first set of light sources of the plurality of light sources are turned on and a first remaining set of light sources of the plurality of light sources are turned off, and a second test pattern in which a second set of light sources of the plurality of light sources are turned on and a second remaining set of light sources of the plurality of light sources are turned off, wherein the first and second sets of light sources share no light source.

2. The method of claim 1, wherein each light source of the first set of light sources is adjacent to only light sources of the first remaining set of light sources.

3. The method of claim 2, wherein the plurality of test patterns further includes:

a third test pattern in which a third set of light sources of the plurality of light sources are turned on; and a fourth test pattern in which a fourth set of light sources of the plurality of light sources are turned on, wherein the first, second, third, and fourth sets of light sources share no light source.

4. The method of claim 3, wherein each of the plurality of light sources belongs to one of the first, second, third, and fourth set of light sources.

5. The method of claim 3, wherein the first set of light sources comprises a first light source, wherein the second set of light sources comprises a second light source horizontally adjacent to the first light source, wherein the third set of light sources comprises a third light source vertically adjacent to the first light source, and wherein the fourth set of light sources comprises a fourth light source diagonally adjacent to the first light source.

6. The method of claim 1, wherein acquiring the plurality of brightness maps of the plurality of light sources comprises:

capturing a plurality of images of a display panel while the display panel is illuminated by the plurality of light sources with the plurality of test patterns; and generating the plurality of brightness maps of the plurality of light sources based on the plurality of images.

7. The method of claim 1, further comprising generating a directivity filter that represents light diffusion characteristics of the plurality of light sources, wherein generating the demura compensation factors for the plurality of light sources is further based on the directivity filter.

8. The method of claim 7, wherein generating the directivity filter comprises:

acquiring a first luminance distribution for a fifth test pattern in which two adjacent light sources of the plurality of light sources are turned on;

acquiring a second luminance distribution for a sixth test pattern in which one of the two adjacent light sources is turned on;

acquiring a third luminance distribution for a seventh test pattern in which the other of the two adjacent light sources is turned on; and generating the directivity filter based on the first, second, and third luminance distributions.

9. The method of claim 7, wherein generating the demura compensation factors for the plurality of light sources comprises:

applying the demura compensation factors and the directivity filter to the cumulative brightness map to generate a compensated brightness map; and modifying the demura compensation factors based on the compensated brightness map.

10. A calibration system, comprising:

a processor; and a storage device configured to store computer-executable instructions which when executed cause the processor to:

acquire a plurality of brightness maps of a plurality of light sources of a two-dimensional backlight system for a plurality of test patterns, each test pattern indicating each of the plurality of light sources to be turned on or off, each of the plurality of light sources being turned on in only one of the plurality of test patterns, wherein the plurality of brightness maps indicate brightness levels of the plurality of light sources for the plurality of test patterns;

produce a cumulative brightness map by adding together the brightness maps; and generate demura compensation factors for the plurality of light sources based on the cumulative brightness map, wherein the plurality of test patterns includes:

a first test pattern in which a first set of light sources of the plurality of light sources are turned on and a first remaining set of light sources of the plurality of light sources are turned off, and a second test pattern in which a second set of light sources of the plurality of light sources are turned on and a second remaining set of light sources of the plurality of light sources are turned off, wherein the first and second sets of light sources share no light source.

11. The calibration system of claim 10, wherein each light source of the first set of light sources is adjacent to only light sources of the first remaining set of light sources.

12. The calibration system of claim 11, wherein the plurality of test patterns further includes:

a third test pattern in which a third set of light sources of the plurality of light sources are turned on; and a fourth test pattern in which a fourth set of light sources of the plurality of light sources are turned on, and wherein the first, second, third, and fourth sets of light sources share no light source.

13. The calibration system of claim 12, wherein the first set of light sources comprises a first light source, wherein the second set of light sources comprises a second light source horizontally adjacent to the first light source, wherein the third set of light sources comprises a third light source vertically adjacent to the first light source, and wherein the fourth set of light sources comprises a fourth light source diagonally adjacent to the first light source.

14. The calibration system of claim 10, further comprising an imaging device configured to capture a plurality of images of a display panel while the display panel is illuminated by the plurality of light sources with the plurality of test patterns, wherein acquiring the plurality of brightness maps of the plurality of light sources comprises generating the plurality of brightness maps of the plurality of light sources based on the plurality of images.

15. The calibration system of claim 10, wherein the computer-executable instructions when executed further cause the processor to generate a directivity filter that represents light diffusion characteristics of the plurality of light sources, and wherein generating the demura compensation factors for the plurality of light sources is further based on the directivity filter.

16. A non-transitory tangible computer-readable storage medium that stores computer-executable instructions which when executed cause a processor to:

acquire a plurality of brightness maps of a plurality of light sources of a two-dimensional backlight system for a plurality of test patterns, each test pattern indicating each of the plurality of light sources to be turned on or off, each of the plurality of light sources being turned on in only one of the plurality of test patterns, wherein the plurality of brightness maps indicate brightness levels of the plurality of light sources for the plurality of test patterns;

produce a cumulative brightness map by adding together the brightness maps; and generate demura compensation factors for the plurality of light sources based on the cumulative brightness map, wherein the plurality of test patterns includes:

a first test pattern in which a first set of light sources of the plurality of light sources are turned on and a first remaining set of light sources of the plurality of light sources are turned off, and a second test pattern in which a second set of light sources of the plurality of light sources are turned on and a second remaining set of light sources of the plurality of light sources are turned off, wherein the first and second sets of light sources share no light source.

17. The non-transitory tangible computer-readable storage medium of claim 16, wherein each light source of the first set of light sources is adjacent to only light sources of the first remaining set of light sources.

18. The non-transitory tangible computer-readable storage medium of claim 17, wherein the plurality of test patterns further includes:

a third test pattern in which a third set of light sources of the plurality of light sources are turned on; and a fourth test pattern in which a fourth set of light sources of the plurality of light sources are turned on, wherein the first, second, third, and fourth sets of light sources share no light source.

19. The non-transitory tangible computer-readable storage medium of claim 18, wherein the first set of light sources comprises a first light source, wherein the second set of light sources comprises a second light source horizontally adjacent to the first light source, wherein the third set of light sources comprises a third light source vertically adjacent to the first light source, and wherein the fourth set of light sources comprises a fourth light source diagonally adjacent to the first light source.

20. The non-transitory tangible computer-readable storage medium of claim 16, wherein the computer-executable instructions when executed further cause the processor to generate a directivity filter that represents light diffusion characteristics of the plurality of light sources, and wherein generating the demura compensation factors for the plurality of light sources is further based on the directivity filter.

* * * * *